United States Patent
Poikat (10) Patent No.: US 11,846,562 B2
(45) Date of Patent: Dec. 19, 2023

(54) MTF TESTING APPARATUS

(71) Applicant: Trioptics GmbH, Wedel (DE)

(72) Inventor: Ralf Poikat, Appen (DE)

(73) Assignee: TRIOPTICS GMBH, Wedel (DE)

( * ) Notice: Subject to any disclaimer, the term of this patent is extended or adjusted under 35 U.S.C. 154(b) by 181 days.

(21) Appl. No.: 17/484,034

(22) Filed: Sep. 24, 2021

(65) Prior Publication Data
US 2022/0099524 A1    Mar. 31, 2022

(30) Foreign Application Priority Data

Sep. 25, 2020   (DE) .................... 10 2020 125 064.9

(51) Int. Cl.
| | |
|---|---|
| H04N 23/52 | (2023.01) |
| G01M 11/02 | (2006.01) |
| G03B 17/56 | (2021.01) |
| H04N 23/90 | (2023.01) |

(52) U.S. Cl.
CPC .... G01M 11/0292 (2013.01); G01M 11/0214 (2013.01); G03B 17/561 (2013.01); H04N 23/52 (2023.01); H04N 23/90 (2023.01)

(58) Field of Classification Search
CPC ......... G01M 11/0292; G01M 11/0214; G01M 11/0207; G01M 11/0257; G03B 17/561; H04N 23/52; H04N 23/90
See application file for complete search history.

(56) References Cited

U.S. PATENT DOCUMENTS

| | | | |
|---|---|---|---|
| 5,969,756 A | 10/1999 | Buckley et al. | |
| 2005/0212951 A1* | 9/2005 | Miyata | G02B 13/001 |
| | | | 348/E5.045 |
| 2009/0295924 A1 | 12/2009 | Peters, III et al. | |
| 2017/0048517 A1* | 2/2017 | Aharon | G01M 11/0207 |
| 2018/0136079 A1 | 5/2018 | Heinisch et al. | |
| 2018/0348084 A1 | 12/2018 | Dumitrescu et al. | |
| 2021/0157295 A1* | 5/2021 | Chiu | B25J 9/1697 |

(Continued)

FOREIGN PATENT DOCUMENTS

| | | | |
|---|---|---|---|
| CN | 106768899 A | * | 5/2017 |
| CN | 206670893 U | * | 11/2017 |

(Continued)

*Primary Examiner* — Michael Lee
(74) *Attorney, Agent, or Firm* — Scully, Scott, Murphy & Presser, P.C.

(57) ABSTRACT

An MTF testing apparatus including a plurality of telescopic cameras each mounted at a fixed predetermined position on a camera holder, each camera receiving an image projected by at least one lens of a single device under test. A processor is coupled to the telescopic cameras. is the processor configured to receive image data from every telescopic camera and perform a plurality of MTF measurements, the telescopic cameras are mounted on the camera holder such that every telescopic camera captures image data resulting in an MTF measurement at a different field position of the lens. The camera holder comprises a holding structure and at least two brackets elongated elements projecting between first and second end portions, the end portions being releasably mounted on the holding structure, and at least two cameras are mounted on every bracket and the brackets are individually detachable from the holding structure.

17 Claims, 4 Drawing Sheets

(56) References Cited

U.S. PATENT DOCUMENTS

2021/0168266 A1* 6/2021 Kuperman ............. H04N 23/57
2021/0227204 A1* 7/2021 Baar .................. G01M 11/0264

FOREIGN PATENT DOCUMENTS

| CN | 107607298 A | | 1/2018 | |
|----|----|----|----|----|
| CN | 105675266 B | | 6/2018 | |
| CN | 207601434 U | * | 7/2018 | ............. G02B 27/62 |
| CN | 207799328 U | * | 8/2018 | |
| CN | 207953066 U | * | 10/2018 | |
| CN | 110186651 A | | 8/2019 | |
| CN | 209205824 U | * | 8/2019 | |
| WO | 2021/171412 A1 | | 9/2021 | |

* cited by examiner

MTF TESTING APPARATUS

CROSS-REFERENCE TO RELATED APPLICATION

The present application claims the benefit of priority to DE 10 2020 125 064.9 filed on Sep. 25, 2020, the entire contents of each of which is incorporated herein by reference.

BACKGROUND

Field

The present disclosure relates to testing apparatus and more particularly to an MTF testing apparatus, comprising: a sample stage for receiving at least one device under test, the device under test comprising at least one lens, a plurality of telescopic cameras which are each mounted at a fixed predetermined position on a camera holder which is a rigid structure in that the telescopic cameras receive an image projected by the at least one lens of a single device under test, and a processor coupled to the telescopic cameras via at least one data link, wherein the telescopic cameras are configured to send image data via the data link to the processor and the processor is configured to receive image data from every telescopic camera and to perform a plurality of MTF measurements by computing an MTF measurement dataset for every telescopic camera from image data received by the telescopic camera, wherein the telescopic cameras are mounted on the camera holder in that every camera captures image data resulting in an MTF measurement at a different field position. The present disclosure further relates to use of this MTF testing apparatus.

Prior Art

The modulation transfer function (MTF) is one parameter for directly and quantitatively indicating the quality of an optical system. MTF measurements are frequently applied in quality control for the characterization of imaging optics. As imaging applications move into high volume markets such as for example mobile phones or automotive applications, high volume MTF testing became a standard in mass production.

An MTF testing apparatus for high-volume MTF testing is for example known from US 2017/0048517 A1. The MTF testing apparatus is capable of measuring a tray loaded with multiple devices under test. Measurements are simultaneously performed by using multiple telescopes or collimators which are shifted in parallel while each collimator or telescope rotates and provides an image of a test structure to its according lens under test. The mechanical arrangement holding the telescopes or collimators enables a parallel movement of the collimators and telescopes, wherein each collimator or telescope is rotating about the center of each lens under test. By irradiating the lens from multiple points around the lens center, MTF values characterizing different points in the field of view, can be measured.

Another measurement principle is based on mounting multiple stationary telescopic cameras at different angles in respect to the lens or device under test. Testing is performed in a one-by-one procedure, where each device under test (DUT) is shifted to the testing position, tested, shifted away from the position and then the next DUT is moved to the testing position. An MTF testing apparatus which is based on this measurement principle is for example the ImageMaster® Pro provided by Trioptics GmbH.

The ImageMaster® Pro MTF testing apparatus comprises a plurality of telescopic cameras, each of which is mounted at a fixed predetermined position. This is achieved by using a dome-shaped camera holder. The cameras are arranged on an inner side of the dome pointing to the center of curvature of the dome. The telescopic cameras are directed to one single device under test. A sample holder placed on an x-y-stage carries the devices under test (DUT). The sample holder sequentially moves one DUT after the other to a test position in which the telescopic cameras capture an image projected by the at least one lens of the device under test. The MTF of different field positions of the DUT can be characterized in parallel because the cameras are mounted in different positions and orientations

SUMMARY

An object is to provide an MTF testing apparatus and a use of the MTF testing apparatus, wherein the MTF testing apparatus can include a plurality of stationary telescopic cameras each mounted at a fixed position for characterizing different points in the field of view of a device under test, wherein the MTF testing apparatus can provide enhanced serviceability.

Such object can be achieved by an MTF testing apparatus, comprising:
  a sample stage for receiving at least one device under test, the device under test comprising at least one lens,
  a plurality of telescopic cameras which are each mounted at a fixed predetermined position on a camera holder which is a rigid structure in that the telescopic cameras receive an image projected by the at least one lens of a single device under test,
  a processor being coupled to the telescopic cameras via at least one data link, wherein the telescopic cameras are configured to send image data via the data link to the processor and the processor is configured to receive image data from every telescopic camera and to perform a plurality of MTF measurements by computing an MTF measurement dataset for every telescopic camera from image data received by said telescopic camera,
  wherein the telescopic cameras are mounted on the camera holder in that every telescopic camera captures image data resulting in an MTF measurement at a different field position.

The camera holder can comprise a holding structure and at least two brackets, which can be elongated elements projecting between a first end portion and a second end portion, the end portions being mounted releasable on the holding structure, and wherein at least two cameras are mounted on every bracket and the brackets are individually detachable from the holding structure.

The camera holder can have a modular configuration. The module can comprise the at least two cameras, which are mounted on every bracket, and the bracket on which the cameras are mounted. The modules of the camera holder can be easily replaced, which allows fast servicing of the MTF measurement apparatus. Furthermore, the modules can be replaced independently from each other. This can be a further significant advantage. This technical aspect makes the MTF measurement apparatus very service-friendly.

Within the context of this specification, a reference to a "camera" can be considered as a reference to a "telescopic camera" without specifically mentioning that the camera is a telescopic camera.

These advantages can be easily understood when considering the following exemplary situation. If an error is detected on one of the cameras of the MTF testing apparatus, a service technician can replace the bracket including this camera together with all the other cameras, which are mounted on the bracket. In other words, the service technician replaces a module of the camera holder. The MTF testing apparatus is operable again after very short downtime. This increases the availability or uptime of the MTF testing apparatus, which can be of significant economic advantage. The module, which is unmounted from the MTF testing apparatus can subsequently be serviced. Service of the camera, for example replacement of a camera, can be more easily performed when working on an individual module. Furthermore, these service works can be performed while the MTF testing apparatus is under operation again. When the cameras are placed on the bracket and form a module together with that bracket, the cameras can be pre-aligned on the bracket. In other words, time required for alignment of the cameras on site, which means at their place they are operated inside the MTF testing apparatus, can be dispensed with or at least significantly reduced. Replacement of the modules can be easily performed even by less experienced users or service technicians. Advantageously, the MTF testing apparatus can have an enhanced availability (as increased uptime) with minimum service required.

According to an embodiment, every bracket can project in a longitudinal direction between the first end portion and the second end portion and the brackets can be mounted on the holding structure in that the longitudinal directions of the brackets are parallel to each other.

The parallel arrangement of the brackets further enhances the serviceability of the MTF testing apparatus. The modules can be replaced fast and easily when the brackets of the modules are arranged parallel to each other. The modules are easy to access. Service works can be a fast and easily performed even by an unexperienced user or service technician.

According to yet another embodiment, the holding structure can comprise a first side element and a second side element, the side elements forming opposite lateral sides of the holding structure, and the first end portions of the brackets can be mounted on the first side element and the second end portions of the brackets are mounted on the second side element.

A holding structure, which comprises the first and second side elements and brackets spanning the space between the two side elements, is mechanically very stable, easy to service and economic to produce. Therefore, a holding structure, which is reliable and suitable for precisely holding a plurality of cameras can be provided.

In other embodiment, the brackets can comprise a curved central portion projecting between the first end portion and the second end portion and the at least two cameras can be mounted in the central portion.

A curved central portion of the brackets simplifies the alignment of the cameras, which are mounted on this bracket. The cameras are aligned so as to point on one single device under test. This requires the optical axes of the cameras to be aligned star-like. If the cameras have at least approximately the same distance from the device under test, an easy way to achieve such an arrangement, is to place the cameras on a curved holder. The center of curvature of this curved holder can be advantageously at least approximately the position of the device under test. In view of this consideration, a bracket comprising a curved central portion for holding the cameras can be used.

The curved portion of the brackets can be bent like a segment of a circle, at least in sections, wherein a center of the circle can be arranged between the camera holder and the sample stage, and the center of the circle can be arranged in a plane of the sample stage.

The center of the circle can be advantageously arranged in a plane, in which the sample stage holds the optical system, for example the lens, of the device under test. The bracket having a curved central portions can be used for easily and precisely holding the cameras in the way required.

In still another embodiment, a cross-section of the brackets can be greater in the first end portion and/or the second end portion when compared to a further cross-section in the central portion.

The cameras inevitably produce exhaust heat. Due to this, the brackets forming part of the camera holding structure also serve as thermal bridges for dissipating the exhaust heat away from the cameras. This can be very efficiently performed using brackets having a greater cross section in the end portions than in the central portion. This type of bracket will efficiently dissipate the exhaust heat into the side elements, because the thermal conductivity of the brackets is higher in the end portions when compared to the central portion.

According to another embodiment, the brackets can be flat members and every bracket can extend in a bracket plane, wherein the at least two brackets can be arranged in that the bracket planes of the at least two brackets cross along a bracket plane crossing line, wherein the bracket plane crossing line can be arranged between the camera holder and the sample stage, and the bracket plane crossing line can be arranged in a plane of the sample stage.

It is explained further above that the cameras are aligned so as to point on one single device under test. This does not only apply to the cameras which are mounted in one module, which means on one bracket. This rule for alignment of the cameras also applies to the cameras, which are mounted on different brackets, which means in different modules. To keep the modules replaceable by each other, the entire module, which means the bracket, can be tilted so as to align the cameras of this bracket on the single device under test. This can very easily and efficiently be achieved by aligning the bracket planes of the individual brackets as mentioned above.

Such configuration can be very advantageous because all modules of the camera holder can be similarly configured. If it is necessary to replace one module, the replacement can be performed irrespective of the particular mounting position of the bracket. In other words, it can be sufficient to have just one single module as a spare part, since this module can be placed at any position of the camera holder.

According to another embodiment, the brackets can be flat elements each having two great surfaces being arranged opposite to each other, wherein the cameras can be mounted on the bracket in that a camera body of every camera is directly mounted on one of the two great surfaces of the bracket.

Efficient heat dissipation of the exhaust heat can be achieved by mounting the camera body directly on the brackets. The greater the contact area between the camera and the bracket, the more efficient the exhaust heat can be dissipated from the camera into the bracket. This is why it can be advantageous to directly mount the camera body on one of the two great surfaces of the bracket.

The dissipation of exhaust heat can be further enhanced in that the holding structure and/or at least one of the brackets can comprise a heat sink, such as, cooling fins.

By providing the holding structure, which means the side elements and/or the brackets with heat sinks, exhaust heat produced by the cameras, can efficiently be dissipated into the environment. It is also possible to only provide the side elements or the brackets with suitable heat sinks. Heat sinks other than cooling fins, for example a liquid cooling system or the like, are within the scope of the embodiment.

Additional suitable cooling means can be provided so as to avoid heat accumulation or extensive thermal convection airflow inside the housing of the MTF testing apparatus. Thermal convection airflow can cause flicker in the captured images and may therefore deteriorate the accuracy of the measurement. Efficient heat dissipation and minimization of thermal convection's in the optical path can for example be achieved by providing the housing of the MTF testing apparatus with fans producing a forced upstream airflow leaving the housing on an upper side.

In an embodiment, a bracket together with the telescopic cameras mounted thereon can form the camera module and all camera modules in the MTF testing apparatus can be similarly configured. This allows easy replacement of the modules with minimum storage cost for replacement parts. In a first approach, only one single module as a spare part on stock can be provided, because irrespective of the question which particular module shows an error, this spare part module will be suitable for replacing it.

Because the configuration of the camera holder allows efficient dissipation of exhaust heat, the density of the cameras and the overall number of cameras, which are applied in the MTF testing apparatus, can be increased. A high packing density can be achieved if the cameras are mounted in a square-shaped pattern. The packing density can be even enhanced if the cameras are arranged in a hexagonal pattern. The square shaped pattern and/or the hexagonal pattern can be at least approximately square shaped and hexagonal, respectively. Considering mathematics, the hexagonal pattern is the arrangement, which allows a maximum density of cameras. The more cameras can be arranged in the MTF testing apparatus, the more precise the device under test can be characterized.

Such object can also be achieved by the use of the MTF testing apparatus according to one or more of the above-mentioned embodiments for performing a plurality of MTF measurements at different field positions of the device under test having at least one lens.

Same or similar advantages, which have been mentioned with respect to the MTF testing apparatus, can also apply to the use of the MTF testing apparatus.

BRIEF DESCRIPTION OF THE DRAWINGS

Further characteristics will become apparent from the description of the embodiments together with the claims and the included drawings. Embodiments can fulfill individual characteristics or a combination of several characteristics.

The embodiments are described below, without restricting the general intent of the invention, based on such exemplary embodiments, wherein reference is made expressly to the drawings with regard to the disclosure of all details that are not explained in greater detail in the text.

In the drawings.

In the drawings, the same or similar types of elements or respectively corresponding parts are provided with the same reference numbers in order to prevent the item from needing to be reintroduced.

DETAILED DESCRIPTION

Figure 1:
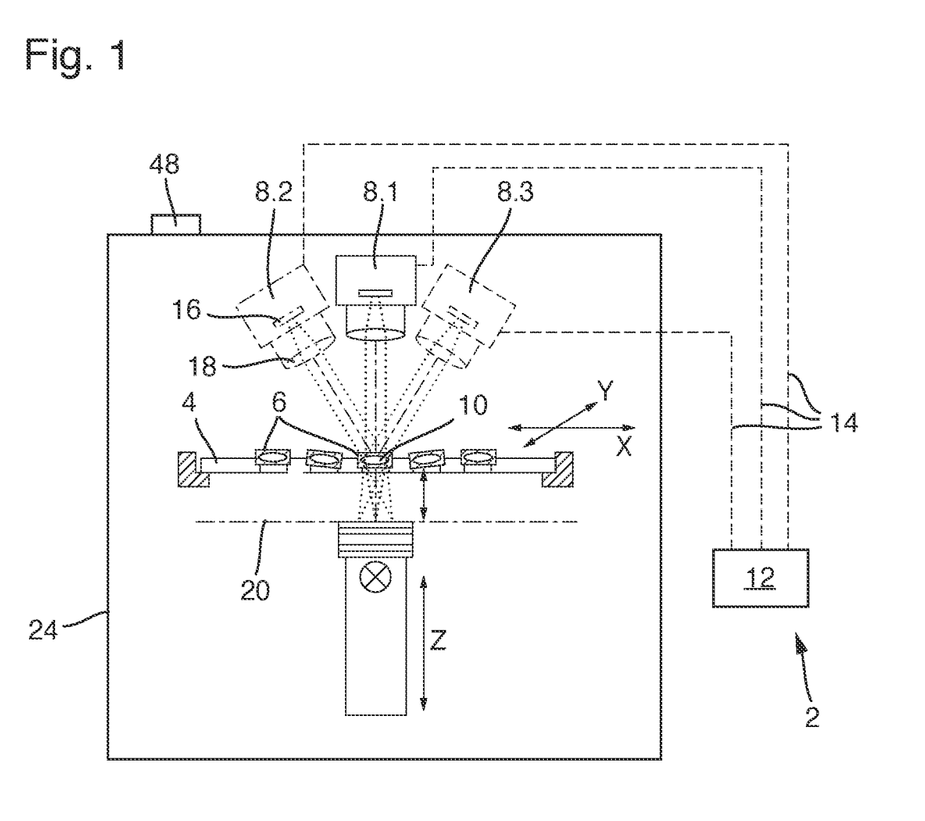
FIG. 1 illustrates a schematic diagram illustrating a measurement principle of the MTF testing apparatus.

FIG. 1 is a schematic diagram illustrating a measurement principle of an MTF testing apparatus 2 according to an embodiment. The MTF testing apparatus 2 comprises a sample stage 4 for receiving a plurality of devices under test 6. For the sake of clarity of the drawings, only one device under test 6 is given a reference number. The sample stage 4 is a high quality tray for receiving the devices under test 6. The sample stage 4 is configured to avoid unwanted tilting of the samples, as it is indicated for two of the samples by way of an example. For the sake of clarity, the tilting angles are overemphasized.

The sample stage 4 is configured to perform a translational movement in an x-y-plane, which is illustrated by the crossed direction arrows. The movement of the sample stage 4 places one device under test 6 at a time at a position for testing. The sample stage 4 changes position to another device 6 to be tested after the MTF test for the first device under test 6 is finished. In other words, the MTF testing apparatus 2 is for sequential testing of the devices under test 6, which means one device 6 at time is tested.

The MTF testing apparatus 2 comprises a first telescopic camera 8.1, which is configured to perform an on-axis MTF measurement. Furthermore, the MTF testing apparatus 2 comprises second and third telescopic camera 8.2, 8.3, which are configured to perform off-axis MTF measurements. The telescopic cameras 8.1 . . . 8.3 are generally referred to as, using reference numeral 8. Within the context of this specification, when reference is made to a "camera" it is considered as reference a "telescopic camera" also without explicitly mentioning that the camera is a "telescopic" camera. The cameras 8.1 . . . 8.3 receive an image projected by a device under test 6. The device under test 6 comprises an optical system having at least one lens 10. Only for simplification of the drawings, the depicted devices under test 6 have a single lens 10. Because the cameras 8.1 . . . 8.3 are mounted on different positions, they are capable of capturing image data resulting in an MTF measurement characterizing different field positions of the optical system, for example of the lens 10, of the device under test 6. Within the context of this specification, when making reference to the lens 10, this can also be considered as a reference to an optical system.

The telescopic cameras 8 are coupled to a processor 12 via suitable data links 14. The processor 12 forms part of the MTF testing apparatus 2 and can comprise hardware or a combination of hardware and software. The telescopic cameras 8 are configured to send image data via the data links 14 to the processor 12. For capturing image data, the telescopic cameras 8 comprise an image sensor 16 and a telescopic imaging optic 18. The processor is configured to receive the captured image data from each of the telescopic cameras 8 and to perform a plurality of MTF measurements by computing an MTF measurement data set for each camera 8 from the image data received by each camera 8.

The captured image data is generated by illuminating the at least one lens 10 of the device under test 6 with the image of reticule, which is positioned in a focus plane 20 of the lens 10. The reticule is moved along a z-axis to perform a through-focus scan.

The MTF testing apparatus 2 comprises a camera holder 22 (not shown in FIG. 1) holding the plurality of cameras 8. The MTF testing apparatus 2 further comprises a housing 24. The processing unit 12 can also be arranged inside the housing 24.

Figure 2:
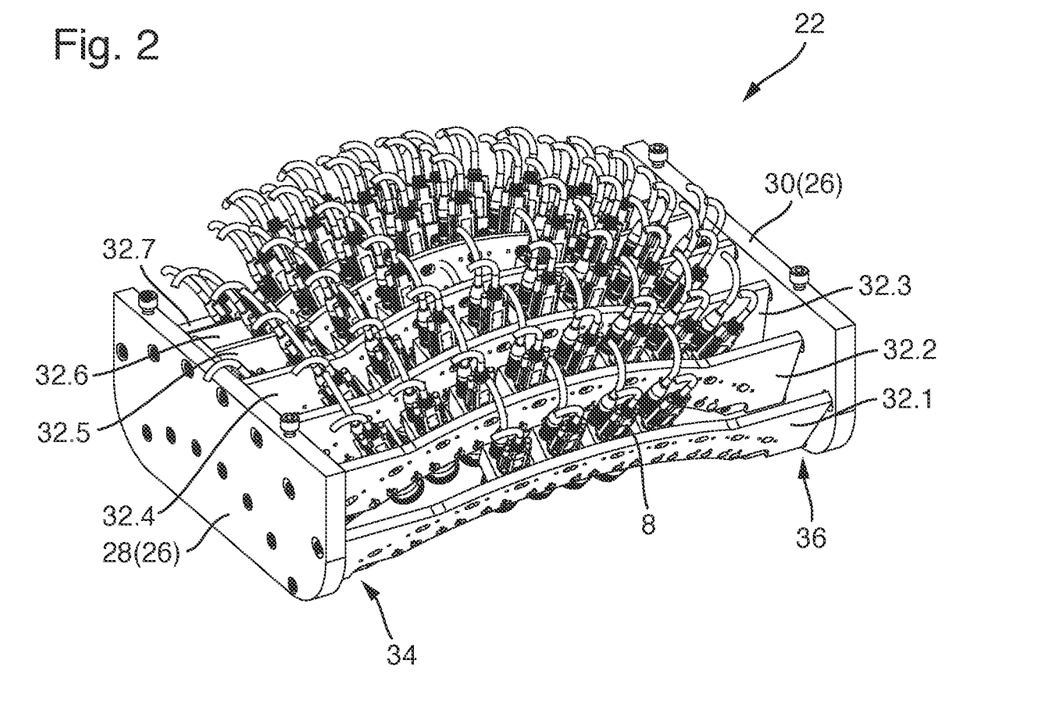
FIG. 2 illustrates a simplified perspective diagram showing a view on a camera holder of the MTF testing apparatus.

FIG. 2 is a simplified perspective diagram showing a view on the camera holder 22 of the MTF testing apparatus 2. The camera holder 22 comprises a holding structure 26, which is configured as a first side element 28 and a second side element 30, according to the depicted embodiment. The side elements 28, 30 form opposite lateral sides of the holding structure 26. Furthermore, the camera holder 22 comprises a plurality of brackets 32.1 . . . 32.7, which are generally referred to as using reference number 32. The brackets 32 are elongated elements projecting between a first end portion 34 and a second end portion 36. At the end portions 34, 36, the brackets 32 are mounted releasable on the holding structure 26, which means on the side elements 28, 30. This is for example achieved by using screws, which are inserted in through holes in the side elements 28, 30 and which are screwed in the end face of the respective brackets 32. There is a plurality of cameras 8 mounted on every bracket 32. The brackets 32 are individually detachable from the holding structure 26. This means that the brackets 32 can be mounted and unmounted individually. It is not necessary to unmount one or more additional brackets 32 if, for example, the neighboring bracket 32 is replaced. This makes the camera holder 22 easy to service.

Figure 3:
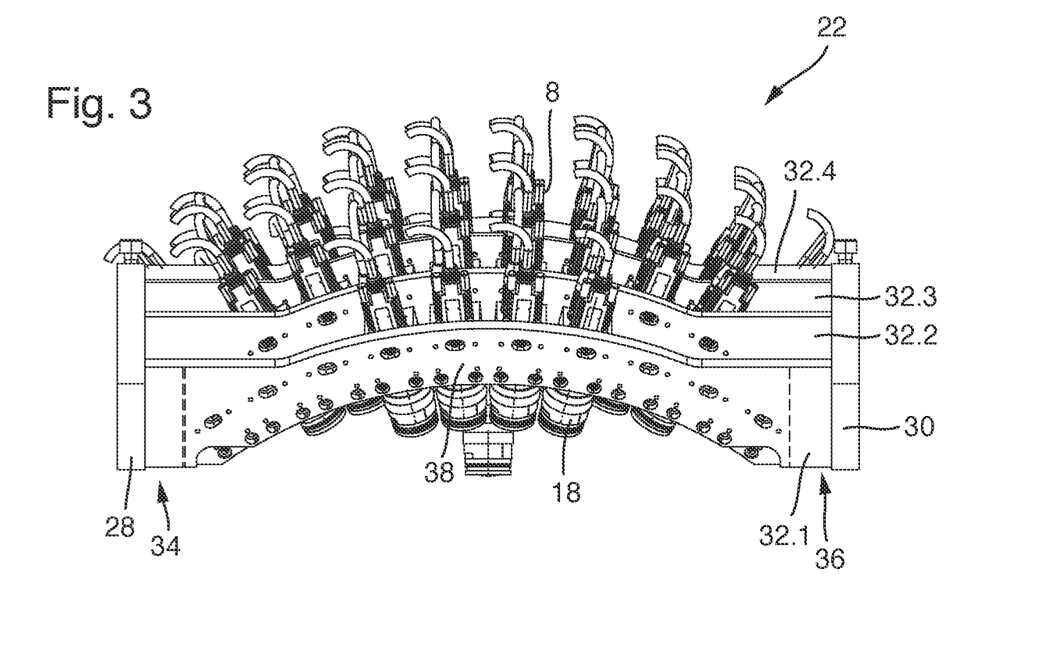
FIG. 3 illustrates another simplified perspective diagram showing a side view on the camera holder.

FIG. 3 is a simplified perspective diagram showing a side view on the camera holder 22. Every bracket 32 comprises a curved central portion 38 projecting between the first end portion 34 and the second end portion 36. The end portions 34, 36 are indicated using dashed lines in FIG. 3. The end portions 34, 36 extend along for example between 1% to 10%, for example, approx. 5%, of the entire length of the bracket 32, which is measured between the end faces of the respective bracket 32.

The curved central portion 38 of the brackets 32 can be bent like a segment of a circle, at least in sections. The bracket 32 is configured in that a center of the circle is arranged between the camera holder 22 and the sample stage 4 (see FIG. 1). The center of this circle can be arranged in the plane of the sample stage 4. It can also be arranged in a central plane of the lens 10 or optical system under test. This configuration of the brackets 32 can be useful for aligning the cameras 8, which are arranged on the bracket 32. Because the cameras 8 are all directed on one single device under test 6 (see FIG. 1) and the cameras 8 can advantageously have at least approximately the same distance to the device under test 6, it can be advantageous to arrange the cameras 8 on a segment of a circle. This can also be achieved by using a bracket 32 having a different shape, however, placing the cameras 8 on the central bend portion 38 allows a configuration in which the cameras 8 are very homogeneously mounted on the bracket 32.

Figure 4:
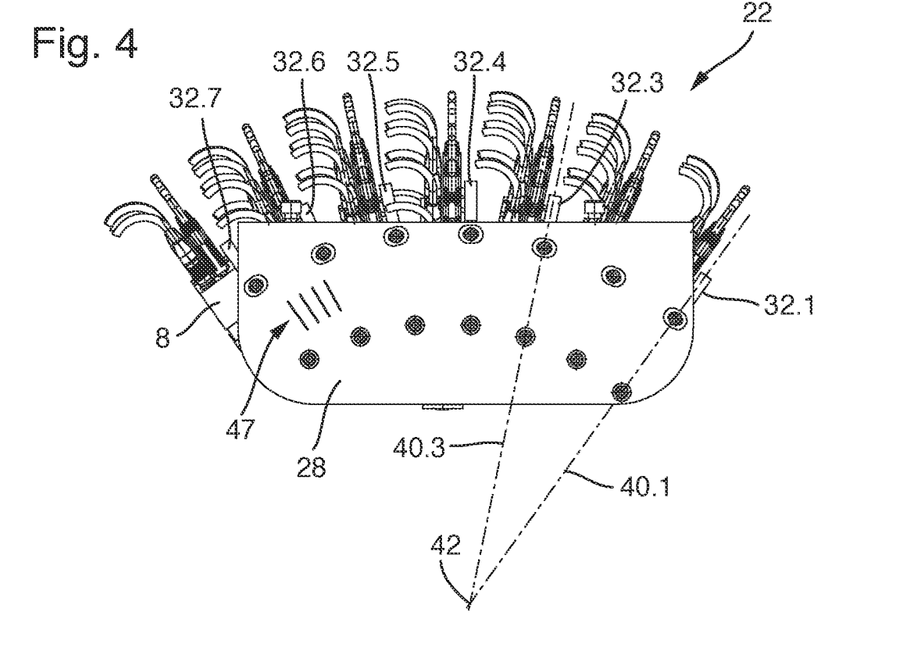
FIG. 4 illustrates still another simplified perspective diagram showing another side view on the camera holder, wherein the viewing direction is different by 90° in comparison to that in FIG. 3.

FIG. 4 is another simplified perspective side view on the camera holder 22. There is a view on the first side element 28 and parts of the respective end faces of the brackets 32. The brackets 32 are flat members and every bracket 32 extends in a bracket plane 40. For the purpose of illustration, a first bracket plane 40.1 for the first bracket 32.1 is illustrated using a dash dot line. Furthermore, a third bracket plane 40.3 for the third bracket 32.3 is illustrated, also using a dash dot line. The bracket planes are commonly referred to as using reference numeral 40. The brackets 32 of the camera holder 22 are arranged in that the bracket planes 40 of the brackets 32 cross along a bracket plane crossing line 42. The bracket plane crossing line 42 is arranged between the camera holder 22 and the sample stage 4 (see FIG. 1). The bracket plane crossing line 42 can be arranged in a plane of the sample stage 4. Furthermore, for every bracket 32, the center of the circle, if the brackets 32 are configured having a curved central portion 38, lies in the bracket plane crossing line 42. In other words, the brackets 32 of the camera holder 22 are tilted such that the cameras 8, which are arranged on the brackets 32, are aligned on the single device under test 6.

This configuration can be advantageous because the brackets 32 together with the cameras 8 form modules, which are easily replaceable. They can be replaceable in that the modules, which are symmetrically arranged with respect to a central module comprising the camera 8.1 performing the on-axis measurement (see also FIG. 5), can be configured to be identical. In other words, these two brackets 32 can be replaced one by the other. This not only applies to the brackets 32, which are directly arranged next to the central bracket 32.4 but are arranged in the second or third line away from the central bracket 32.4.

Figure 5:
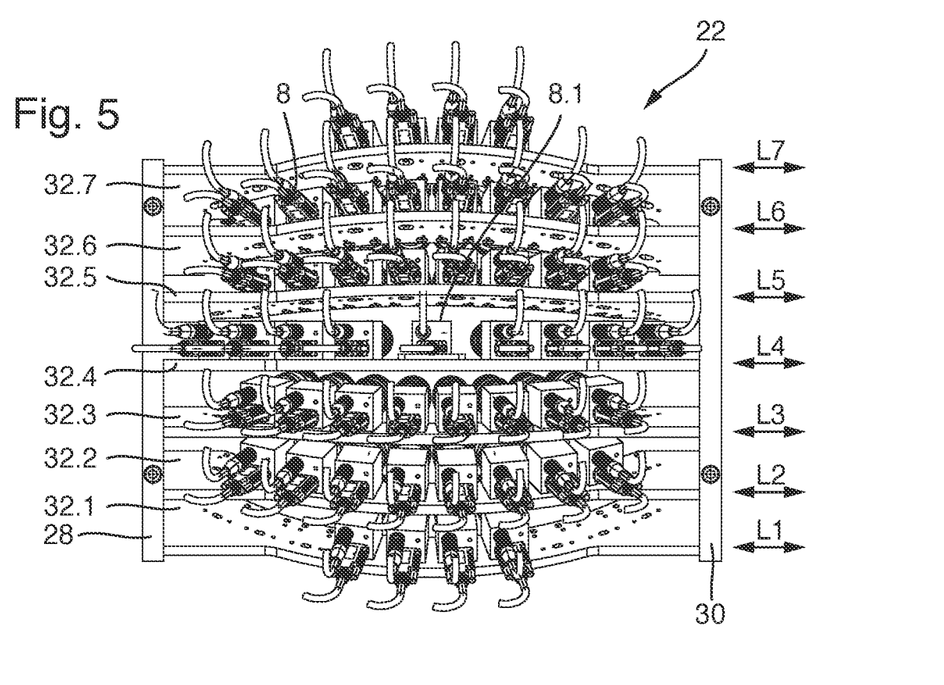
FIG. 5 illustrates a simplified perspective diagram showing a top view on the camera holder.

This can easily be seen in the schematic simplified perspective top view in FIG. 5. Furthermore, it can be seen that the brackets 32 each project in a longitudinal direction L1 . . . L7, commonly referred to as using reference sign L. The longitudinal directions L of the brackets 32 are indicated by the double arrows shown next to the camera holder 22 on the right side thereof. The longitudinal directions L of the brackets 32 each project between the first end portion 34 and the second end portion 36 of a respective one of the bracket 32. The brackets 32 are mounted in the holding structure 26, which means on the first and second side elements 28, 30 in that the longitudinal directions L1 . . . L7 of all brackets 32 are parallel to each other.

Figure 6:
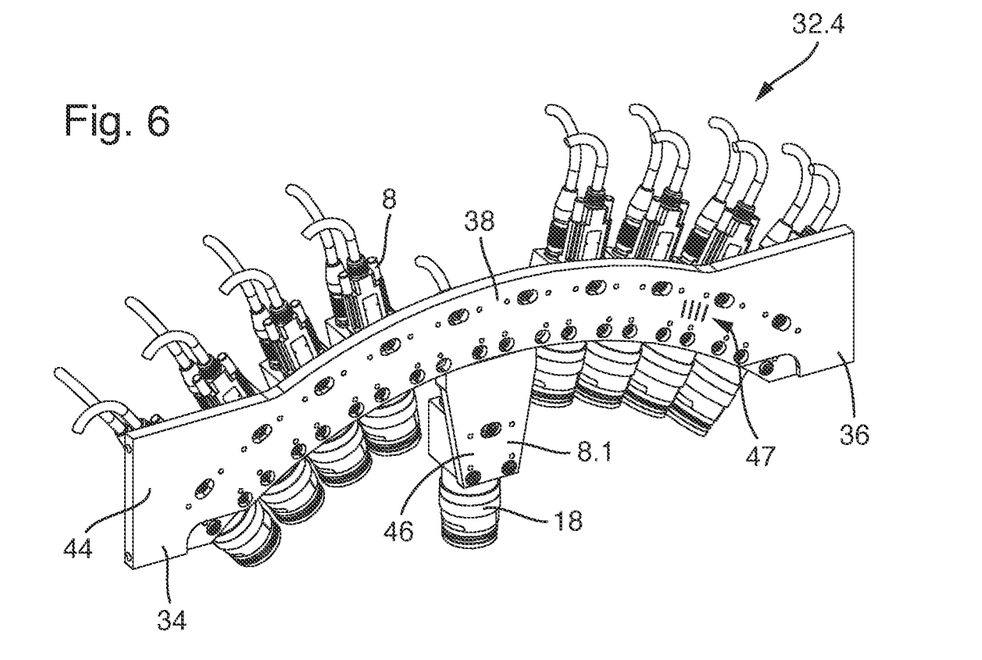
FIG. 6 illustrates another simplified perspective diagram showing a view on a single module of the camera holder, including a plurality of telescopic cameras, which are mounted on a bracket.

FIG. 6 is a simplified perspective view showing the central bracket 32.4 of the camera holder 22. Which can be seen in FIG. 6 on the central bracket 32.4 and illustrative for all brackets 32 is that a cross section of the bracket 32 is greater in the first end portion 34 and the second end portion 36 compared to a further cross section in the curved central portion 38. This can be advantageous because the brackets 32 also serve as thermal bridges for dissipating exhaust heat from the cameras 8 into the side elements 28, 30. The greater the cross section in the end portions 34, 36 the higher the thermal conductivity, when compared to the central portion 38. This allows heat to dissipate into the holding structure 26, for example into the side elements 28, 30.

The brackets 32 are flat elements each having two opposite great surfaces. One great surface 44 is visible in FIG. 6. The cameras 8 are directly mounted on the bracket 32 in that a camera body 46 of every camera 8 directly contacts one of the two great surfaces 44 of the bracket 32. By directly mounting the camera body 46 on the great surface 44 of the bracket 32, good thermal conductivity between the camera 8 and the bracket 32 can be provided. This is mainly due to the great contact surface between the two parts. This helps to dissipate exhaust heat from the cameras 8 into the brackets 32.

The brackets 32 can be provided with cooling fins 47. The same applies to the side elements 28, 30 and the holding structure 26 in general. The cooling fins 47 allow heat to dissipate into the environment, which means into the interior of the housing 24 (see FIG. 1). The cooling fins 47 are schematically illustrated in FIGS. 4 and 6. The cooling fins 47 can be differently configured and can extend in other parts of the shown parts. To discharge the heat from the housing 24, fans 48 can be arranged in or on a top plate of the housing 24. They can discharge warm air from the interior of the housing 24 into an exterior environment.

Efficient heat dissipation allows the cameras 8 to be arranged in a close packing. For example, the cameras 8 can be mounted in at least approximately a square shaped pattern or in a hexagonal pattern. In FIG. 5, a nearly hexagonal arrangement is shown, by way of an example only.

The MTF testing apparatus 2 can be suitable performing a plurality of MTF measurements at different field positions of a device 6 under test having at least one lens 10.

While there has been shown and described what is considered to be preferred embodiments, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

LIST OF REFERENCES

2 MTF testing apparatus
4 sample stage
6 device under test
8, 8.1, 8.2, 8.3 telescopic camera
10 lens
12 processing unit
14 data link
16 image sensor
18 telescopic imaging optic
20 image plane
22 camera holder
24 housing
26 holding structure
28 first side element
30 second side element
32.1 . . . 32.7, 32 bracket
34 first end portion
36 second end portion
38 curved central portion
40.1, 40.3, 40 bracket plane
42 bracket plane crossing line
44 great surface
46 camera body
47 cooling fins
48 fan
L1 . . . L7, L longitudinal direction

What is claimed is:

1. A modulation transfer function (MTF) testing apparatus comprising:
   a sample stage for receiving at least one device under test, the device under test comprising at least one lens;
   a camera holder having a rigid structure;
   a plurality of telescopic cameras each being mounted at a fixed predetermined position on the camera holder such that each of the plurality of telescopic cameras receive an image projected by the at least one lens of a single device under test of the at least one device under test; and
   a processor comprising hardware, the processor being coupled to each of the plurality of telescopic cameras via at least one data link;
   wherein the plurality of telescopic cameras are each configured to send image data via the data link to the processor and the processor is configured to receive the image data from each of the plurality of telescopic cameras and to perform a plurality of MTF measurements by computing an MTF measurement dataset for each of the plurality of telescopic cameras from the image data received by each of the telescopic cameras;
   each of the plurality of telescopic cameras are mounted on the camera holder such that each of the plurality of telescopic cameras captures the image data resulting in an MTF measurement at a different field position,
   the camera holder comprises a holding structure comprising:
      a first end portion and a second end portion;
      at least two brackets, each of the at least two brackets being elongated between the first end portion and the second end portion, the first and second end portions being releasably mounted on the holding structure, and
   at least two telescopic cameras of the plurality of telescopic cameras are mounted on each of the at least two brackets and each of the at least two brackets are configured to be individually detachable from the holding structure;
   wherein each of the at least two brackets are flat members and extend in a corresponding bracket plane, each of the at least two brackets being arranged in the corresponding bracket plane of the at least two brackets cross along a bracket plane crossing line.

2. The MTF testing apparatus according to claim 1, wherein each of the at least two brackets projects in a corresponding longitudinal direction between the first end portion and the second end portion and each of the at least two brackets are mounted on the holding structure in the corresponding longitudinal directions of the brackets parallel to each other.

3. The MTF testing apparatus according to claim 1, wherein the holding structure further comprises a first side element and a second side element, the first and second side elements forming opposite lateral sides of the holding structure, and the first end portion of each of the at least two brackets being mounted on the first side element and the second end portion of each of the at least two brackets being mounted on the second side element.

4. The MTF testing apparatus according to claim 1, wherein the at least two brackets comprise a curved central portion projecting between the first end portion and the second end portion and the at least two telescopic cameras are mounted in the curved central portion.

5. The MTF testing apparatus according to claim 4, wherein the curved central portion of each of the at least two brackets is bent in a segment of a circle, at least in sections.

6. The MTF testing apparatus according to claim 5, wherein a center of the segment of the circle is arranged between the camera holder and the sample stage.

7. The MTF testing apparatus according to claim 6, wherein the center of the segment of the circle is arranged in a plane of the sample stage.

8. The MTF testing apparatus according to claim 4, wherein a cross-section of the at least two brackets is greater in one or more of the first end portion and the second end portion as compared to a cross-section in the curved central portion.

9. The MTF testing apparatus according to claim 1, wherein the bracket plane crossing line is arranged between the camera holder and the sample stage.

10. The MTF testing apparatus according to claim 9, wherein the bracket plane crossing line is arranged in a plane of the sample stage.

11. The MTF testing apparatus according to claim 1, wherein one or more of the holding structure and at least one of the at least two brackets comprise a heat sink.

12. The MTF testing apparatus according to claim 11, wherein the heat sink comprises one or more cooling fins.

13. The MTF testing apparatus according to claim 1, wherein one of the at least two brackets having the at least two telescopic cameras mounted thereon form a camera module.

14. The MTF testing apparatus according to claim 13, wherein each of the at least two brackets form the camera module.

15. The MTF testing apparatus according to claim 1, wherein the plurality of telescopic cameras are mounted in one of a square shaped pattern and in a hexagonal pattern.

16. The MTF testing apparatus according to claim 1, wherein each of the at least two brackets are flat elements each having two surfaces arranged opposite to each other, wherein the at least two telescopic cameras are mounted on each of the at least two brackets in that a camera body of each of the at least two cameras is directly mounted on one of the two surfaces of the bracket.

17. A modulation transfer function (MTF) testing apparatus comprising:
    a sample stage for receiving at least one device under test, the device under test comprising at least one lens;
    a camera holder having a rigid structure;
    a plurality of telescopic cameras each being mounted at a fixed predetermined position on the camera holder such that each of the plurality of telescopic cameras receive an image projected by the at least one lens of a single device under test of the at least one device under test; and
    a processor comprising hardware, the processor being coupled to each of the plurality of telescopic cameras via at least one data link;
    wherein the plurality of telescopic cameras are each configured to send image data via the data link to the processor and the processor is configured to receive the image data from each of the plurality of telescopic cameras and to perform a plurality of MTF measurements by computing an MTF measurement dataset for each of the plurality of telescopic cameras from the image data received by each of the telescopic cameras;
    each of the plurality of telescopic cameras are mounted on the camera holder such that each of the plurality of telescopic cameras captures the image data resulting in an MTF measurement at a different field position,
    the camera holder comprises a holding structure comprising:
        a first end portion and a second end portion;
        at least two brackets, each of the at least two brackets being elongated between the first end portion and the second end portion, the first and second end portions being releasably mounted on the holding structure, and
    at least two telescopic cameras of the plurality of telescopic cameras are mounted on each of the at least two brackets and each of the at least two brackets are configured to be individually detachable from the holding structure;
    wherein each of the at least two brackets are flat elements each having two surfaces arranged opposite to each other, wherein the at least two telescopic cameras are mounted on each of the at least two brackets in that a camera body of each of the at least two cameras is directly mounted on one of the two surfaces of the bracket.

* * * * *